United States Patent [19]
Sailer

[11] Patent Number: 5,733,976
[45] Date of Patent: Mar. 31, 1998

[54] EFFECT PAINT AND EFFECT PAINTING METHOD ESPECIALLY FOR PAINTING MOTOR VEHICLE BODIES

[75] Inventor: Maria-Theresia Sailer, Ulm, Germany

[73] Assignee: Daimler-Benz AG, Stuttgart, Germany

[21] Appl. No.: 602,157

[22] Filed: Feb. 15, 1996

[30] Foreign Application Priority Data

Feb. 16, 1995 [DE] Germany ............... 195 05 161.0

[51] Int. Cl.⁶ ................ C09K 19/04; C09D 5/36
[52] U.S. Cl. ............... 525/100; 525/477; 524/588; 524/268; 524/269; 428/447; 427/387
[58] Field of Search ............... 528/25; 525/100, 525/477; 428/447; 427/387; 524/588

[56] References Cited

U.S. PATENT DOCUMENTS

| | | | |
|---|---|---|---|
| 4,388,453 | 6/1983 | Finkelman et al. | 528/25 |
| 5,011,884 | 4/1991 | Rosenau et al. | 524/537 |
| 5,098,978 | 3/1992 | Riepel et al. | 528/15 |
| 5,188,760 | 2/1993 | Hikmet et al. | 252/299.01 |
| 5,211,877 | 5/1993 | Anderjewski et al. | 252/299.01 |
| 5,242,617 | 9/1993 | Metzger et al. | 252/299.5 |
| 5,245,002 | 9/1993 | Kuo | 528/176 |
| 5,362,315 | 11/1994 | Müller-Rees et al. | 106/497 |
| 5,442,025 | 8/1995 | Spes et al. | 528/15 |

FOREIGN PATENT DOCUMENTS

| | | |
|---|---|---|
| 66137 | 12/1982 | European Pat. Off. . |
| 358 208 | 3/1990 | European Pat. Off. . |
| 601 483 | 6/1994 | European Pat. Off. . |
| 3808430 | 9/1989 | Germany . |
| 3831873 | 3/1990 | Germany . |
| 4008076 | 9/1991 | Germany . |
| 4240743 | 6/1994 | Germany . |
| 4307344 | 9/1994 | Germany . |
| WO 93/12195 | 6/1993 | WIPO . |
| WO 95 32247 | 11/1995 | WIPO . |

*Primary Examiner*—Ralph H. Dean
*Attorney, Agent, or Firm*—Evenson McKeown Edwards & Lenahan, PLLC

[57] ABSTRACT

The invention relates to painted objects, especially motor vehicle bodies, and effect paints for painting such objects. The effect paint has a color-producing paint layer comprising liquid crystal polymer compounds, especially those based on organopolysiloxanes, and surface-active compounds, especially polysiloxanes and/or polyacrylates. The paint is applied directly to the objects to be painted, e.g. by a spray or dip application. As a result, even convex surfaces can be painted simply, completely, and uniformly with liquid crystal polymers.

15 Claims, 8 Drawing Sheets

EFFECT PAINT AND EFFECT PAINTING METHOD ESPECIALLY FOR PAINTING MOTOR VEHICLE BODIES

BACKGROUND AND SUMMARY OF THE INVENTION

The present invention relates to effect paint made of liquid crystal side-chain polymers (LCP) in which the mesogenic units are arranged at least approximately chiral-nematically. The present invention also relates to objects, especially motor vehicle bodies, painted in multiple layers, wherein the color-determining paint layer of the paint comprises a closed film of crosslinked liquid crystal side-chain polymers (LCP), with the mesogenic units arranged at least approximately chiral-nematically.

Liquid crystal interference pigments for effect paints are described in, for example from Spes et al., U.S. Pat. No. 5,442,025 (counterpart of German Patent No. DE 40 08 076), Finkelmann et al., U.S. Pat. No. 4,388,453 (counterpart of European patent No. EP 66 137), Hikmet et al., U.S. Pat. No. 5,188,760, and Mueller-Rees et al., U.S. Pat. No. 5,362,315, (counterpart of German Patent No. DE 42 40 743), the disclosures of which are incorporated herein by reference.

In conventional solid motor vehicle paints, color pigments are usually embedded in a clear carrier made of synthetic resin, with the pigments determining the desired paint color. The color effect of these pigments is based on a spectrally selective absorption effect so that a spectrally wide portion of the incident white light is absorbed by the pigment and only a spectrally narrow portion is reflected.

In an effort to provide brighter color impressions, especially on motor vehicle bodies, effect paints have been developed. In one such type of effect paint, the metallic paints, small metal flakes are mixed as pigments into the paint. In another type of effect paint, coated mica particles are used as pigments. In these effect paints, better color brightness is achieved than with traditional solid paints. In addition, depending on the direction from which the light strikes the paint and/or the direction from which the paint is viewed, a slightly modified, desirable, color impression is produced.

Metzger et al., U.S. Pat. No. 5,242,617 (counterpart of European Patent No. EP 383 376) describes an effect paint in which small mica flakes are coated uniformly on all sides with a crosslinked liquid crystal polymer (LCP) in a chiral-nematic arrangement. The color appearance of such pigments results from an interference phenomenon. The only incident light waves reflected are those whose wavelengths interfere with the equidistant crosslinking plane intervals of the liquid crystal polymers, while light of other wavelengths goes through the clear paint body and is adsorbed by the (preferably) dark background. Such platelet-shaped interference pigments aligned parallel to the painted surface, when viewed orthogonally, have a certain first color, the basic color, and when viewed at an angle have a second color with a shorter wavelength. A paint color that depends on the viewing angle makes the paint very effective and desirable for applications in which such color effects are viewed positively by potential customers. The disadvantage lies in the costly manufacture of the interference pigments, so that effect paint and also effect painting can be very expensive.

Interference pigments based on polysiloxanes are also disclosed in the prior art, and consist entirely of small fragments of thin crosslinked film made of liquid crystal polymers. The interference pigments themselves are colorless and clearly transparent. The color effect is based on the regular structure and uniform arrangement of the molecules in the liquid crystal and on the resultant interference of a certain spectral portion of light for which the pigment has a reflecting effect. The other spectral portions of light pass through the pigment. As a result, striking color effects of different kinds can be achieved depending on the nature of the paint or the interference pigments that form its base and the way in which they are mixed. Apart from the novel aesthetic color effects of this paint, this paint also has a number of technical advantages.

One condition required for the appearance of liquid crystal phases in these polymers is a rigid mesogenic molecular structure. The repeating units of liquid crystal polymers contain mesogenic units. The two molecular structures that are most frequently encountered are side-chain LC polymers in which the mesogenic units are chemically fixed as side chains of the polymer backbone, and main chain LC polymers in which the mesogenic units form the polymer backbone or part of the polymer backbone. In addition to such homopolymers, a number of copolymers are possible which can contain various mesogenic units or both non-mesogenic and mesogenic units.

An object of the present invention is to apply effect paint directly as a coating material on an object to be painted, producing a bright color impression even on convex surfaces.

The object is achieved according to the present invention for effect paint wherein at least one surface-active compound is added to the polymers to produce an automatic, distinctly color-effective, i.e. color-effect-intensifying, alignment of the mesogenic units in a chiral-nematic arrangement during paint application and for objects painted with such an effect paint. The present invention also relates to a method for producing a painted object with an effect paint wherein the paint is applied to the object by means of a spray or dip application, with the mesogenic units then automatically aligning themselves in a distinctly color-effective manner, i.e. in a manner that intensifies the color effect, in a chiral-nematic arrangement, Films of liquid crystal polymer material with a color that depends on the viewing angle can be applied by spray application onto three-dimensional components with considerable improvement in the brightness of the color impression in contrast to films produced by known techniques.

One advantage of the present invention is that it is possible with the effect paint or the effect painting method to apply a color-producing layer directly not only on flat surfaces but also on curved and/or convex surfaces, without intermediate steps, i.e. without mechanical action for orientation of the liquid crystal polymer materials. Additionally, it is not necessary to mix the color-producing substance with a paint primer before application. According to a preferred embodiment, the color impression of the effect paint is achieved after coating the base material with a non-crosslinkable starting material by freezing below the critical glass temperature or in the case of a crosslinkable starting material, by curing above the critical glass temperature by employing an appropriate curing process. The effect paint according to the present invention exhibits very good color brightness and has an outstanding resistance to light.

In a further preferred embodiment, the effect paint is directly applied alone by means of a spray or dipping process onto the object to be painted, preferably onto motor vehicle bodies, even if the object is convex. The orientation of the liquid crystal polymer material is achieved without any mechanical effect of any kind. The color impression that is achieved is accomplished after the coating process in a non-crosslinkable material by freezing below the critical glass temperature or in a crosslinkable material by curing above the critical glass temperature in a suitable curing process.

Liquid crystal materials by nature are self-organizing or self-ordering compounds. In other words the longitudinal axes of the mesogenic units automatically assume a preferential direction when they are in the liquid crystal phase. This orientation, however, occurs only with respect to the liquid crystal material itself. In order for the reflection colors of chiral-nematic phases to have an effect, their corresponding mesogens must additionally assume a certain arrangement with respect to the surface. The longitudinal axes of the mesogenic units must lie in a plane that is parallel to the substrate surface (homogeneous arrangement). Then the crosslinking planes are formed from which the angle-dependent interference results. However, this orientation does not take place automatically to a sufficient degree.

Crosslinking planes in a layer of such liquid crystal polymers can be formed by using an automatic film applicator and then applying mechanical shear. However, this is possible in practice only on flat surfaces. To paint non-flat surfaces, platelet-shaped interference pigments are produced from crosslinked coatings that were originally produced flat by careful grinding and size selection, and then mixed into paint. Painting with such a paint produces a coating that has a color flop or in other words, a reflection which depends on the viewing or illumination angle of the light components of different wavelengths with a pronounced peak at a certain point in the spectrum. However, because of the mixing of the platelet-shaped interference pigments, such effect paints have a sort of metallic or spangled effect that is not necessarily desirable.

The possibility of applying effect paints composed of liquid crystal polymer(s) according to the present invention, is achieved by providing the liquid crystal polymer with an orientation-improving additive and then applying it directly, for example in a spray or dip application, onto the substrate surface to be coated. If, for example, a surface-active polysiloxane or polyacrylate in amounts of from 0.01 to 5.0 wt. % is added to the liquid crystal polymer solution, then following thermal treatment the interference colors finally appear on the base of the corresponding chiral-nematic phase from an initially milky, colorless to white coating starting material on a relatively dark substrate. In this manner, a coating with a solid character is obtained, without a spangled effect which also has a color flop and which can be used to paint objects such as motor vehicle bodies.

Such orientation-facilitating additives according to the present invention, improve the interferential color effect and can be used independently of the identity of the base material of the chiral-nematic polymers in the paint. In other words, the application does not depend on the nature of the substrate surface and can be applied as a spraying or dipping application of solvent, water-based, or powder paints.

Optionally, the additives that produce the color-deepening effect can be added directly to the coating material or applied before the application of the coating as a primer coat.

The color of the substrate to which the effect paint is applied determines the intensity of the color effect of the chiral-nematic coating. A preferably black substrate surface absorbs the portion of the incoming linearly polarized light which is circularly polarized in one direction, while the portion that is circularly polarized in the opposite direction is reflected. By selecting different colors for the substrate surface, the ratio between the absorbed and reflected radiation is varied. In this manner, matte colors can also be achieved with such a coating.

Other objects, advantages and novel features of the present invention will become apparent from the following detailed description of illustrative preferred embodiments when considered in conjunction with the accompanying drawings.

DETAILED DESCRIPTION OF PREFERRED EMBODIMENTS

In the following experiments, solutions of a chiral-nematic polymer were applied to different substrates, usually by means of a spray application. As a result of subsequent heating in the temperature range of the chiral-nematic phase, an orientation of the mesogenic units is initiated which can be distinctly improved by the addition of suitable additives according to the present invention. The temperature can vary over the entire chiral-nematic range, however, the higher the temperature, the more rapidly orientation takes place because the viscosity is then lower.

The following characteristic values were then determined from the resultant films:

Layer density (measured with a Dualscope, by Fischer);

Reflection value of the wavelengths of maximum reflection (measured with a color view spectrophotometer made by Byk Gardener of Geretsried, Germany (with a 45°/0° observation geometry, and a tungsten-halogen bulb, roughly corresponding to CIE Standard A, at a color temperature of 2854° K));

Half-width value of the reflection peak, i.e. width of the peak in nm measured at half the height from zero percent; and Ratio of reflection value to the half-width value.

The determination of the ratio of reflection value to the half-width value permits an evaluation of the quality or brightness of the color intensity obtained. Table 3 summarizes the results obtained in determining these values.

The experiments detailed below clearly show the improvement resulting from the addition of an additive according to the invention. While the ratio, namely that of the reflection value to the half-width value, definitely decreases in LCP-pigmented films with decreasing layer thickness, as seen Example 2b where a 29 μm layer thickness has a ratio of only 0.23, the ratio is much better in homogeneous LCP-films applied by spray application. Therefore, depending on the formulation (Examples 3b, 3c, 3d, 3e, $3g^1$ to $3g^4$, 4b), ratio values of up to 0.4 can be achieved. However, the fact that the background of the LCP-pigmented films is blacker, because of adhesion reasons, than that of homogeneous LCP-films must be taken into account, so that LCP-pigmented films give comparatively better results.

The ratio of reflection value to half-width value could not be determined for Examples 3a and 4a, because without a color-deepening additive, the reflection bands are very wide and the reflection color is not bright.

The reproducibility of the reflection peak position can be evaluated based on Experiments $3g^1$ to $3g^4$, which use the same formulation. From the results for Experiments $3g^1$ to $3g^4$, it can be determined that the reflection peak position varies by 15 nm. However, it should be noted that the accuracy of the color-measuring device is ±5 nm.

Figure 4:
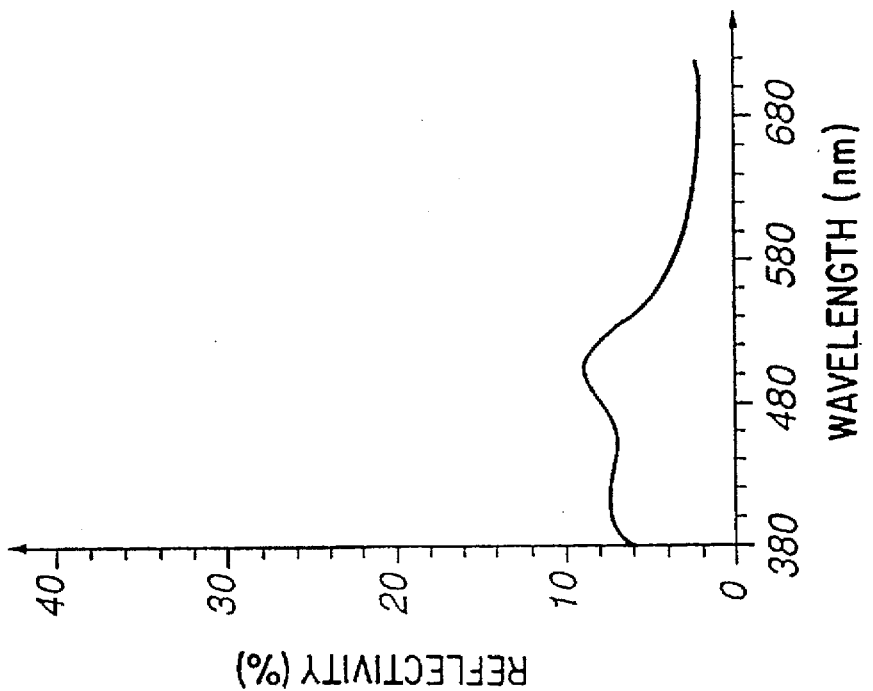
Figure 3:
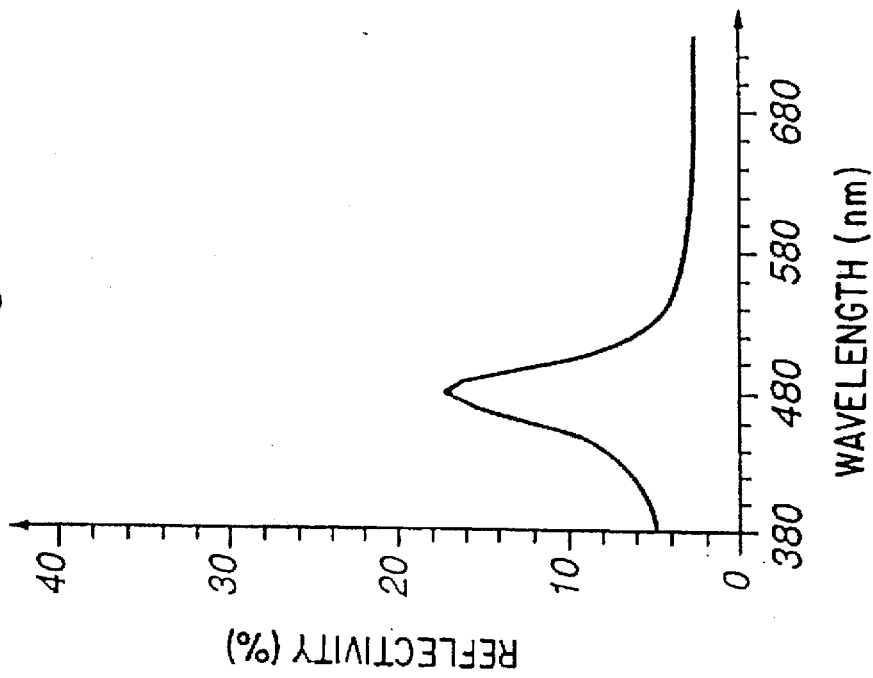
Figure 14:
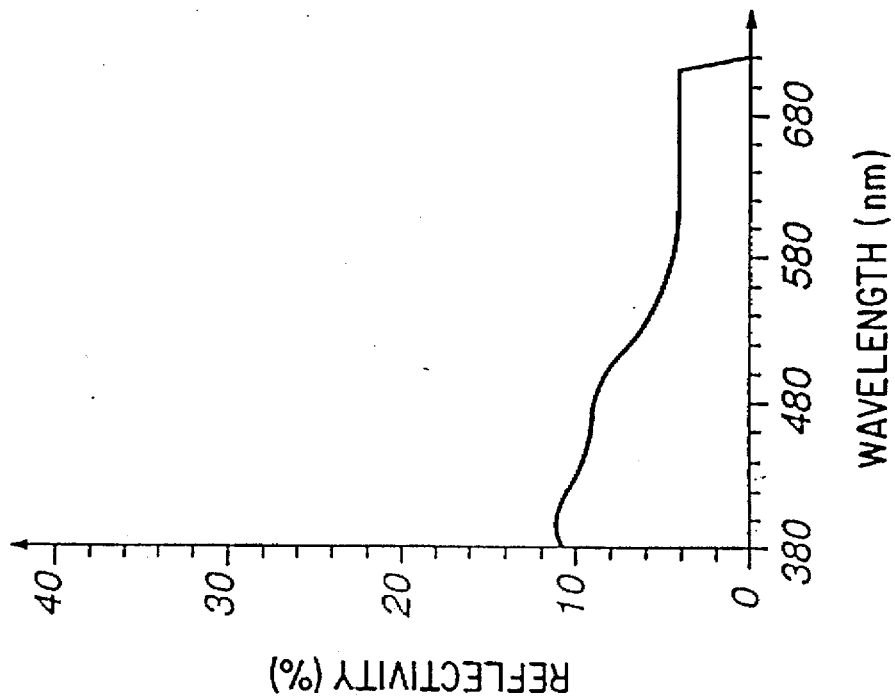
Figure 13:
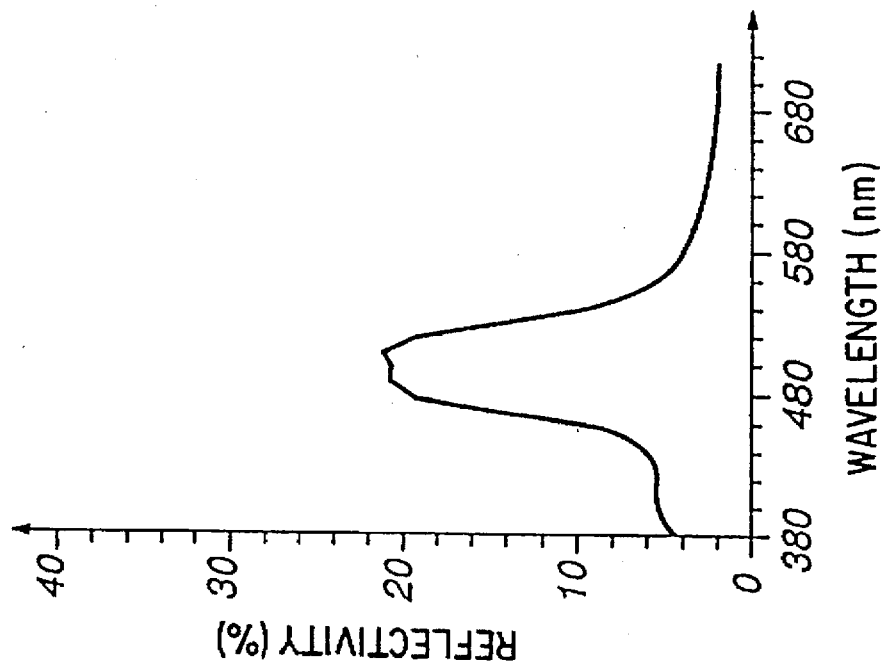
Figure 15:
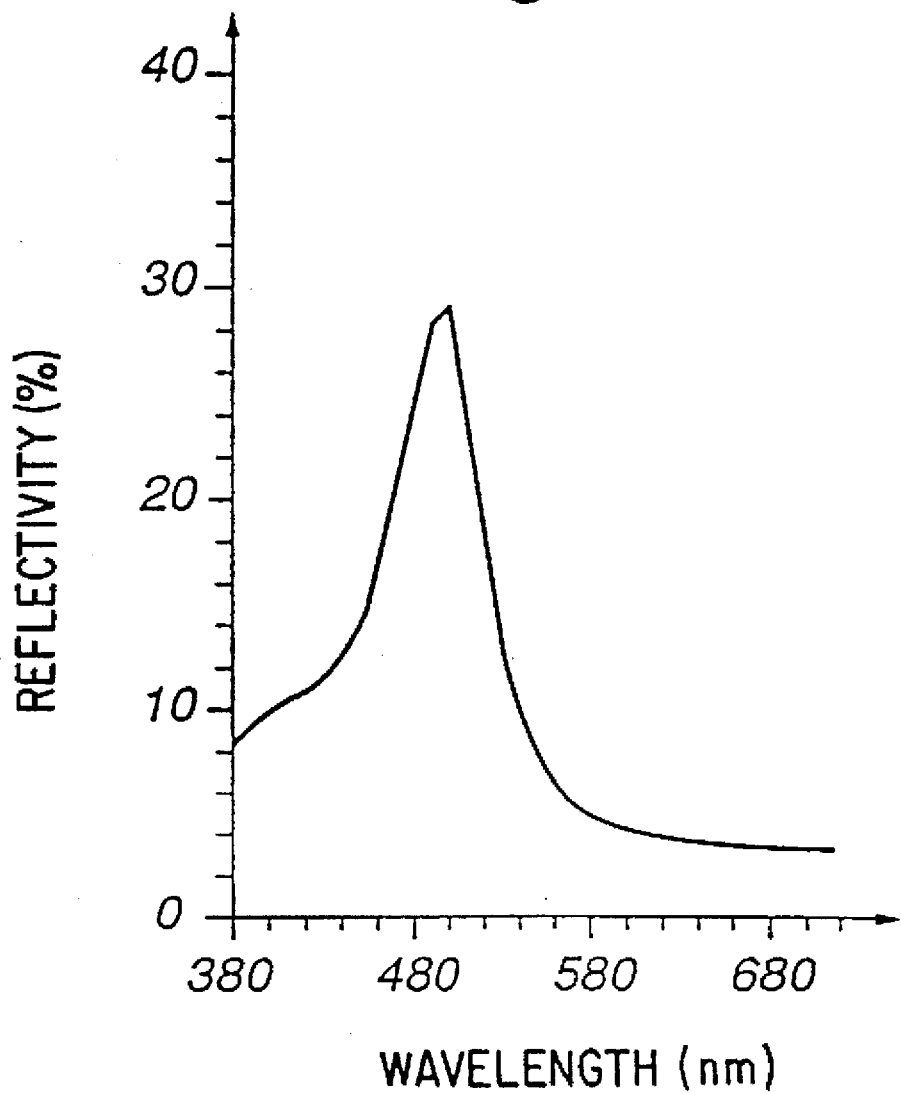

FIGS. 1 to 15, corresponding to Experiments 1a to 4b respectively (as seen in Table 1), show the dependence of color on the qualitative addition of paint additive to the liquid crystal polymers, the manner of application, and the color of the substrate. The wavelength is plotted in nanometers on the abscissa of the graph and the reflectivity, i.e. the degree of reflection or the reflectivity of the applied layer, is plotted in percent on the ordinate. Experiments 3b to $3g^4$ and 4b were performed according to the present invention, while Experiments 1a, 2a, 2b, 3a, and 4a are comparison tests using different techniques. Experiments 3a and 4a did not lead to the desired high color brightness result, and accordingly, only the corresponding remission curves in FIGS. 4 and 14 show no typical spectrally narrow reflectivity maxima.

Table 1 is a table listing the corresponding individual remission curve figures for the individual experiments. Table 1 also lists the application technique used in each case, as well as whether any orientation-improving additives were added.

TABLE 1

| FIG. No. | Test No. | Application technique | Orientation-improving additive |
|---|---|---|---|
| 1 | 1a | Shearing, Spreading | no |
| 2 | 2a | Spraying | no, LCP-pigment |
| 3 | 2b | Spraying | no, LCP-pigment |
| 4 | 3a | Spraying | no |
| 5 | 3b | Spraying | yes |
| 6 | 3c | Spraying | yes |
| 7 | 3d | Spraying | yes |
| 8 | 3e | Spraying | yes |
| 9 | 3f | Spraying | yes |
| 10 | $3g^1$ | Spraying | yes |
| 11 | $3g^2$ | Spraying | yes |
| 12 | $3g^3$ | Spraying | yes |
| 13 | $3g^4$ | Spraying | yes |
| 14 | 4a | Spraying | no |
| 15 | 4b | Spraying | yes |

Description of Experiments
Experiment 1a

Figure 1:
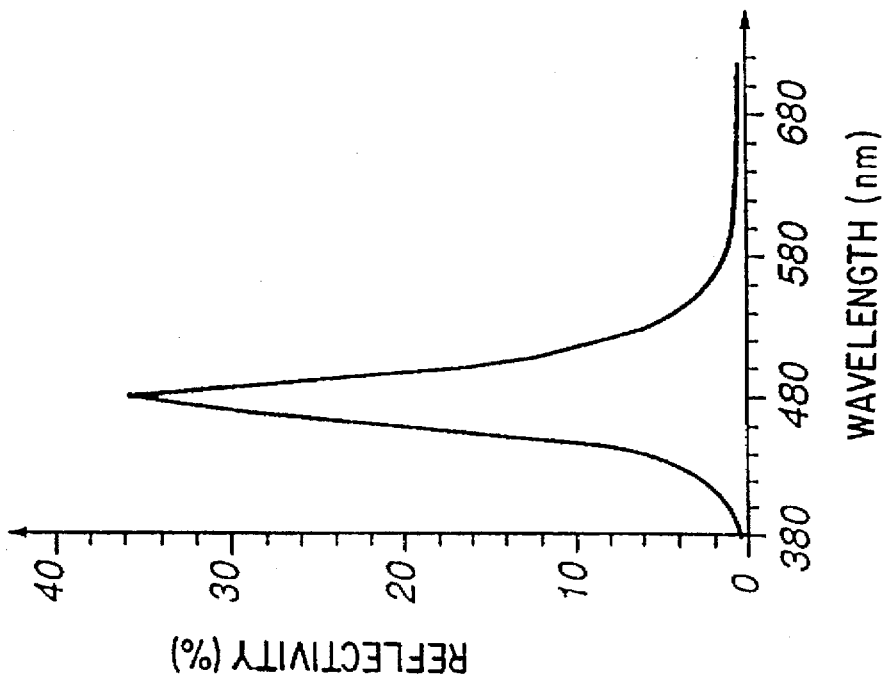

Five grams of liquid crystal polymer LCP 520 (Wacker-Chemie, Munich) were heated to 100 °C. for 10 min on a black-primed test sheet. The tough viscous material produced by the melting process was spread out to form a film using the automatic film applicator 4344-1 SP (Braive Instruments, Liège, Belgium) at a shear rate of 5 mm/s. The film was cured and the coating subjected to a reflection test. FIG. 1 shows the resulting remission curve. The coating shows a very narrow band reflection peak which is attributable to the shearing effect when the LCP coating was applied to the flat test sheet and the resulting alignment of the mesogenic units in the LCP paint. This good result however, as previously mentioned, is only possible with a mechanical shearing application, which is feasible in practice only on flat surfaces.

Figure 2:
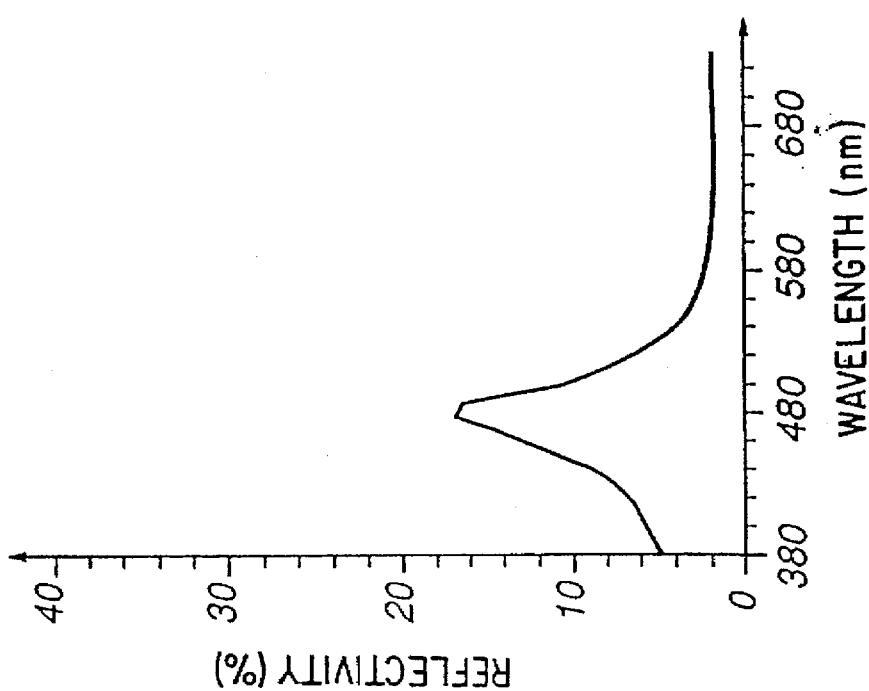
FIGS. 1 to 15 show the dependence of color on the qualitative addition of a paint additive to the liquid crystal polymers, the manner of application, and the color of the substrate. The wavelength is plotted in nanometers on the abscissa of each graph and the reflectivity, i.e. the degree of reflection or the reflectivity of the applied layer, is plotted in percent on the ordinate.

Experiment 2a 4 wt. % LCP pigment, produced from LCP 520 (Wacker-Chemie, Munich, Germany), was dispersed for 30 min in a clear Standox lacquer system (Herberts, Wuppertal, Germany), and the mixture was sprayed using a spray gun (SATA-Farbspritztechnik, Kornwestheim, Germany) onto a black-primed test sheet. After allowing the solvent to evaporate for 25 min, the paint layer was cured in a paint drying chamber for 45 min at 100° C. The resultant remission curve is shown in FIG. 2. Due to the very tiny disk-shaped pigmentation flakes of the interferentially acting layer, the pigments arrange themselves parallel to the background and thus produce a color effect similar to that in Experiment 1a. The reflection peak, however, is less markedly pronounced than in Experiment 1a (FIG. 1). This application technique corresponds to the prior art in Mueller-Rees et al., U.S. Pat. No. 5,362,315, (counterpart of German Patent No. DE 42 40 743).

Experiment 2b

The procedure is the same as in Experiment 2a, but after 10 min of initial evaporation of the solvent, another spraying step was performed. After allowing this solvent to evaporate for another 25 min, the procedure was then continued as above. The color brightness is similar to that in Experiment 2a, and the remission curve can be seen in FIG. 3.

Experiment 3a

A solution of 10.50 g LCP (green) in 41.00 g xylene was sprayed by means of a DC sprayer (Merck, Darmstadt, Germany) onto a test sheet primed with a filler. After allowing the solvent to evaporate for 10 min, the test sheet was heated for 30 min on a heating plate that had been preheated to 130° C. The initially milky white film gradually changed to a matte green color. The remission curve shown in FIG. 4 shows no pronounced peak, and no half-width value could be reliably determined. This poor result can be attributed to the spray application and the absence of orientation-facilitating additives.

Experiment 3b

Figure 5:
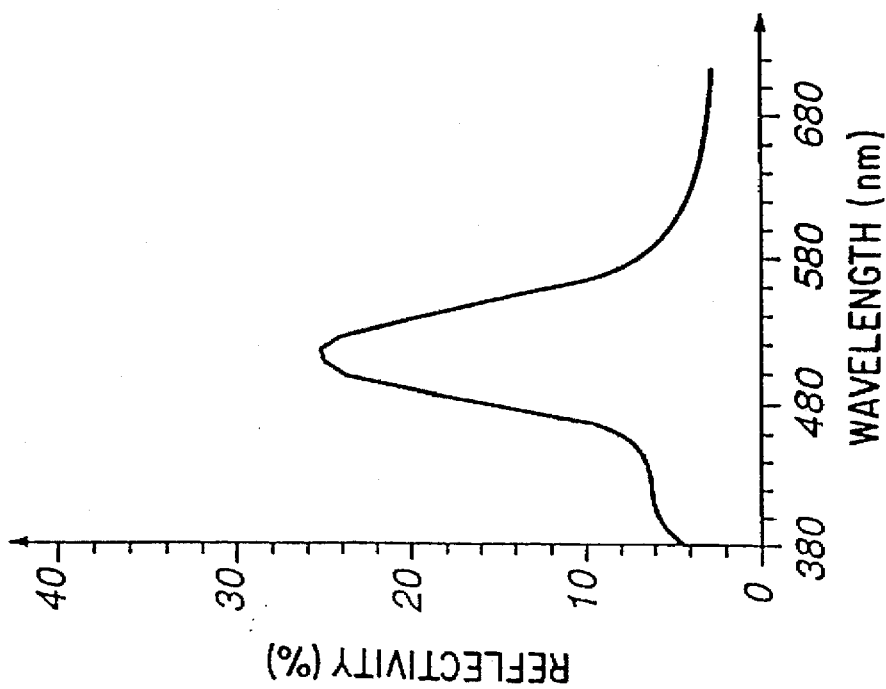

The same solution as in 3a with the addition of 0.05% Byk-310 was sprayed onto a test sheet primed with filler. After allowing the solvent to evaporate for 10 min, the test sheet was heated for 30 min on a heating plate previously preheated to 130° C. The initially milky white film gradually changed to an intense bluish-green color with a distinct color flop into the blue. The corresponding remission curve shown in FIG. 5 shows a distinctly pronounced peak which, in comparison to Experiment 3a and the corresponding remission curve in FIG. 4, clearly shows the color-improving effect of the Byk-310 additive.

Experiment 3c

Figure 6:
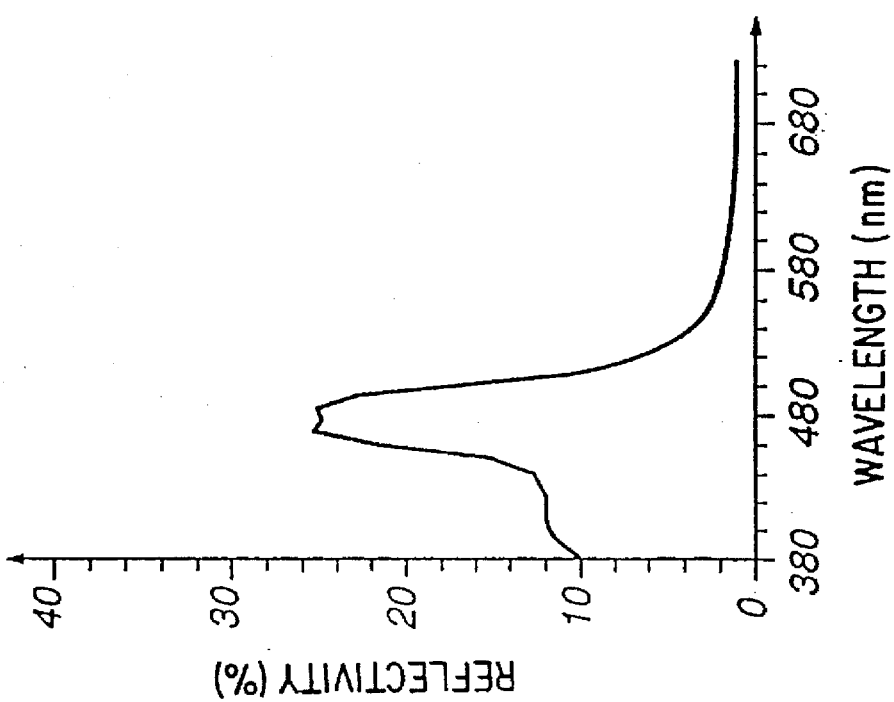

The procedure is the same as for 3b, but with the addition of 0.10% Troythix XYZ as a rheology aid, sprayed on a black-primed test sheet. This additive also produces a distinctly narrow-band reflection peak as shown in FIG. 6.

Experiment 3d

Figure 7:
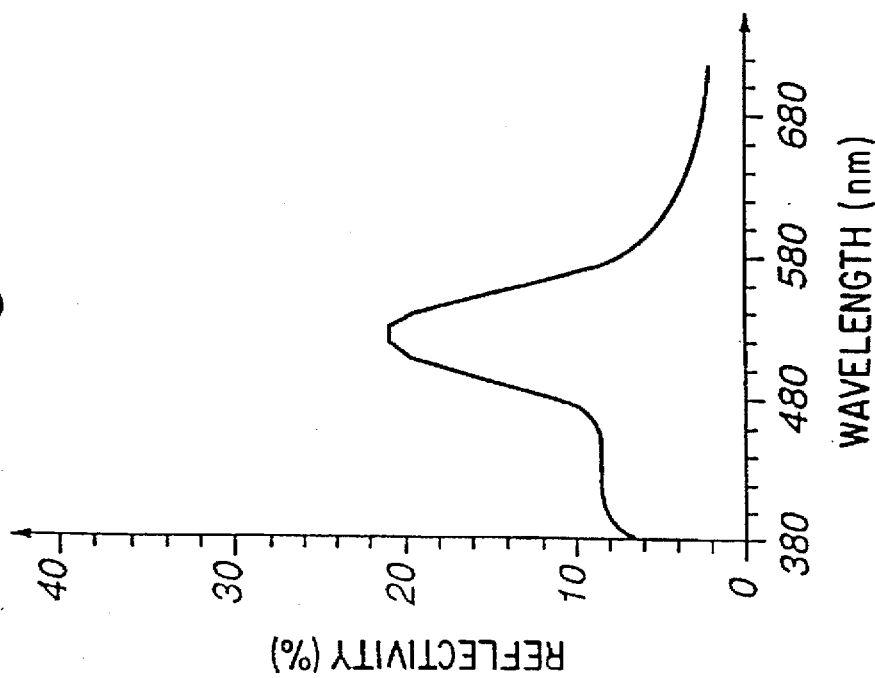
Figure 10:
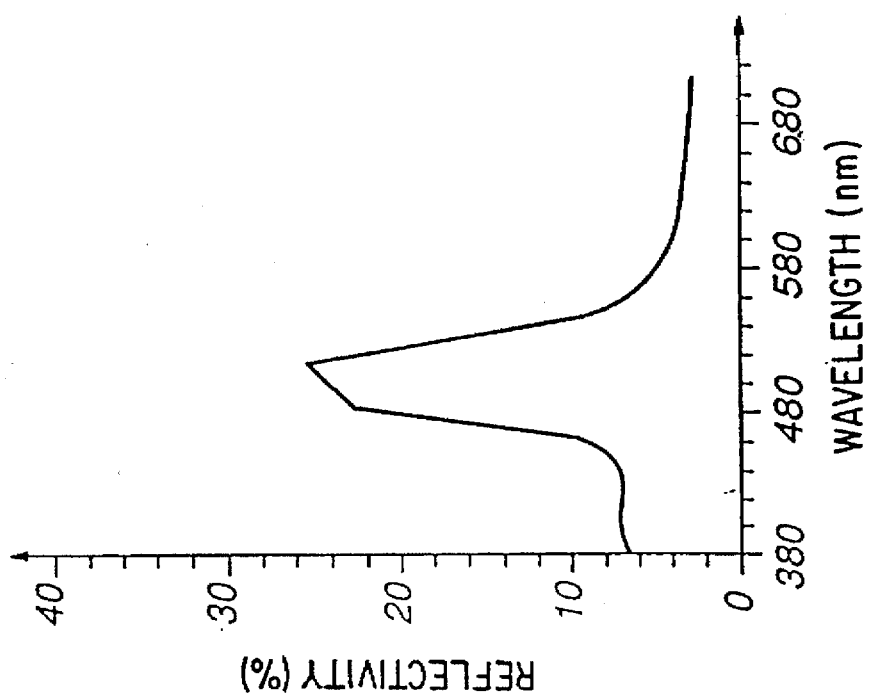

A solution of 50.0 g LCP (green) in 200.00 g xylene with an addition of 0.05% Byk-310 and 5.00% Cereclor S52 was sprayed onto a test sheet primed with a filler. The remission curve is shown in FIG. 7.

Experiment 3e

Figure 8:
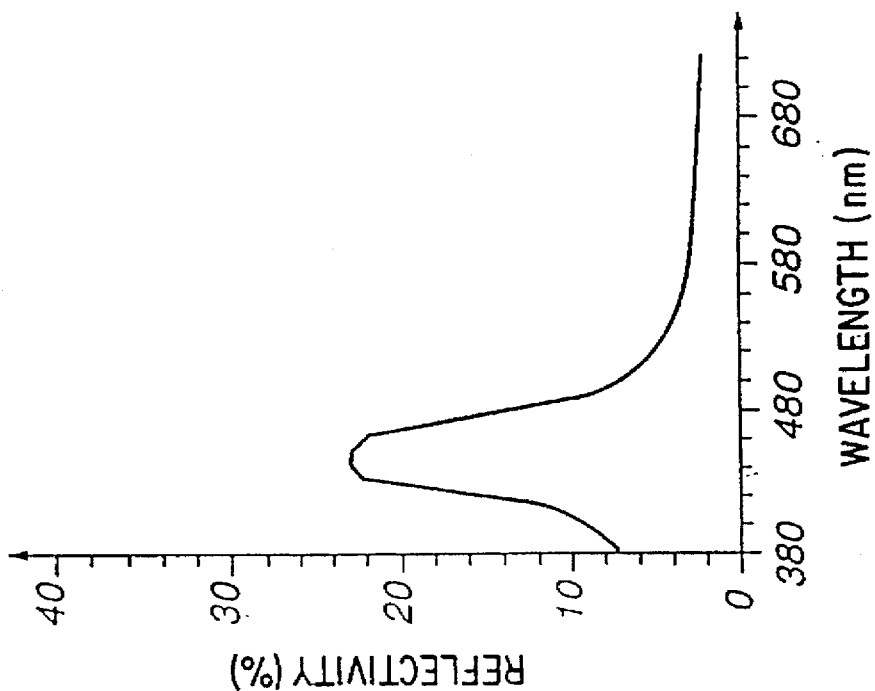

The procedure is the same as for Experiment 3d, but with the addition of a blue LCP mixture. The remission curve is shown in FIG. 8.

Experiment 3f

Figure 9:
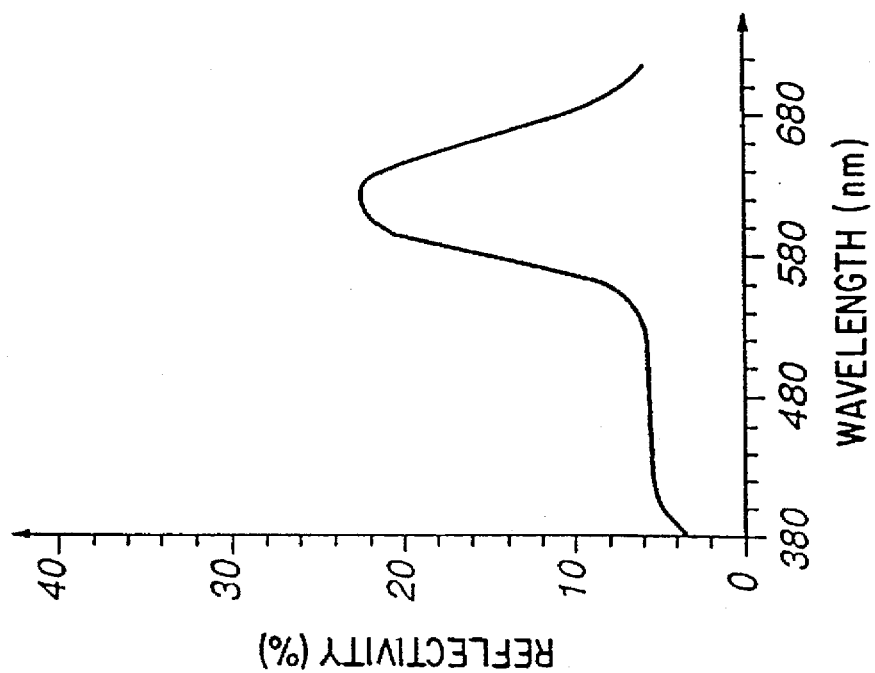
Figure 12:
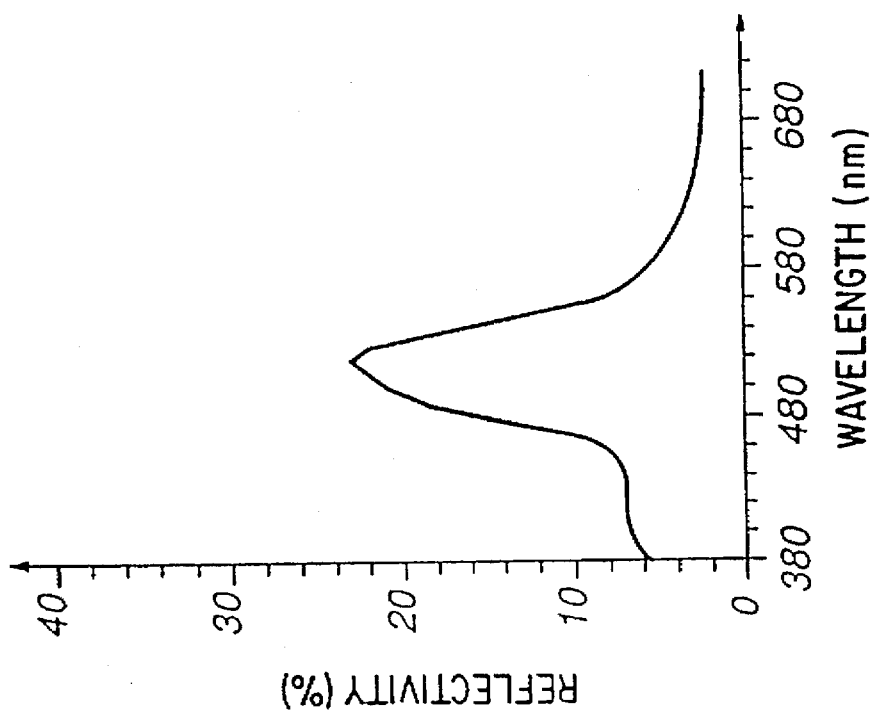
Figure 11:
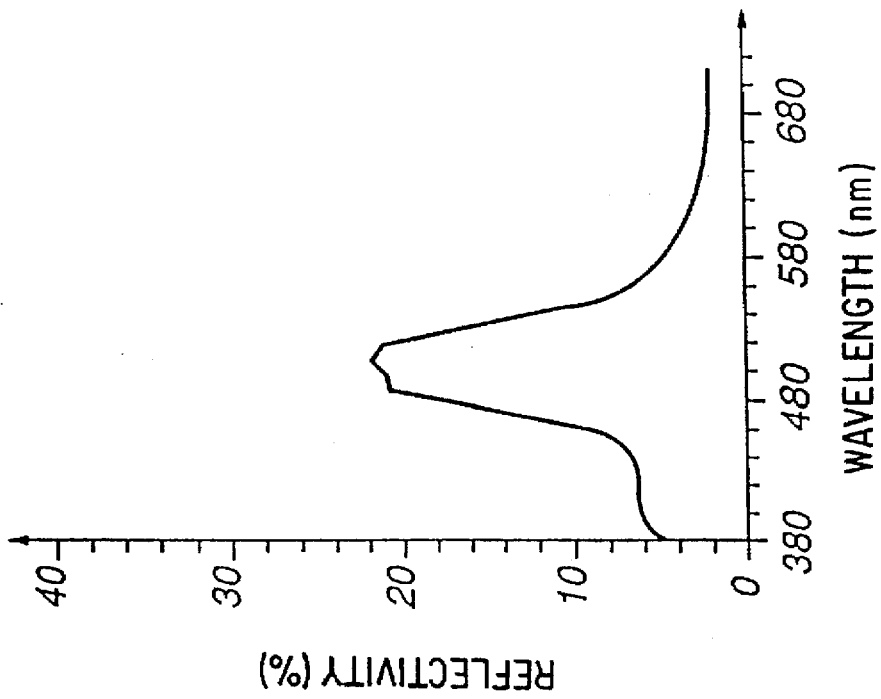

The procedure is the same as for Experiment 3d, but with the addition of a red LCP mixture. The remission curve is shown in FIG. 9.

Experiment 3g

A solution of 20.00 g LCP (green) in 100.00 g. toluene with an additive composed of 0.05% Byk-310 and 5.00%

Cereclor S52, 0.40% Perenol F-40 and 0.40% Additol XL 490/50 as a flow agent was sprayed onto a test sheet primed with a filler. This experiment was performed four times, corresponding to Experiments $3g^1$, $3g^2$, $3g^3$ and $3g^4$, with the same formulation, but newly prepared each time. In Tables 1 and 3 the individual experiments are identified by the superscript numbers. Despite careful performance of the test, the remission curves vary slightly as shown in FIGS. 10 to 13, respectively, but no visual color differences could be seen. The relatively small differences in evaluation criteria: position and height of the reflection peak, half-width value, ratio of the reflection peak height to the half-width value can be seen in Table 3.

Experiment 4a

The procedure was carried out similarly to Experiment 3a, but with a different substrate, namely a glass slide. The same solution as in 3a, in other words, a solution without orientation-improving additives, was sprayed onto the glass slide. After allowing the solvent to evaporate for 10 min, the slide was heated for 30 min on a heating plate preheated previously to 130° C. The matte green reflection of the polymer film could be seen on a black substrate. The remission curve as shown in FIG. 14, shows no reflection peak as expected.

Experiment 4b

The procedure was carried out similarly to Experiment 3b, but likewise with a glass plate as a the substrate. The same solution as in 3b, with the addition of 0.05% Byk-310 was sprayed onto the glass slide. After allowing the solvent to evaporate for 10 min, the slide was heated for 30 min on a heating plate preheated previously to 130° C. On the black substrate, an intensive green reflection could be seen. The remission curve in FIG. 15 again clearly shows a pronounced reflection peak.

The following is a detailed description of the materials used.

LCP: Chiral-nematic polysiloxane (Wacker-Chemie, Munich, Germany) mixtures of the following two components:

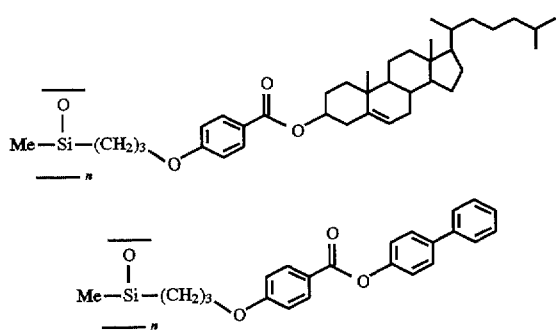

TABLE 2

| Wacker LC Silicone | $T_g$ | $T_c$ | l |
|---|---|---|---|
| C-4768 (red) | G2121 | 40–50 | 180–210 | 675 |
| C-4754 (green) | G2125 | 45–55 | 180–210 | 540 |
| C-4745 (blue) | G2116 | 40–50 | 180–210 | 450 |

LCP520: Pigment (green-blue) of chiral-nematic polysiloxane (Wacker, Munich)

Paint additive: Byk-310 (Byk-Chemie, Wesel)

Paint additive: Troythix XYZ (Troy Chemicals, Krefeld)

Paint additive: Cereclor S52 (Deutsche ICI, Frankfurt)

Paint additive: Additol XL 490/50 (Hoechst, Frankfurt)

Aluminum sheets: P-36 (pausch-Prüftechnik, Haan) (76× 152 mm; 0.625 mm thick; chromated and primed in black)

Aluminum sheets: P-36 (pausch-Prüftechnik, Haan) (76× 152 mm; 0.625 mm thick; chromated)

Anthracite Primer: MB filler (Mercedes-Benz AG, Sindelfingen plant)

Glass slide: (Schott Glaswerke, Mainz) (26×76 mm)

Table 3 shows an overview of the experimental results obtained.

TABLE 3

| Experiment No. | Substrate | Color-deepening additive | Layer thickness [μm] | Peak [nm] | Reflection [%] | Half-width value [nm] | Ratio of reflectivity to half-width value |
|---|---|---|---|---|---|---|---|
| 1a | Black Sheet | — | 25 | 480 | 37 | 39 | 0.95 |
| 2a | Black Sheet | — | 47 | 480 | 17 | 66 | 0.26 |
| 2b | Black Sheet | — | 29 | 480 | 15 | 63 | 0.23 |
| 3a | Paint Filler | — | 12 | 505 | 9 | — | — |
| 3b | Paint Filler | Byk-310 | 13 | 515 | 25 | 82 | 0.30 |
| 3c | Black Sheet | Byk-310 | 20 | 480 | 25 | 75 | 0.33 |
| 3d | Paint Filler | Byk-310 | 14 | 525 | 22 | 87 | 0.25 |
| 3e | Paint Filler | Byk-310 | 12 | 445 | 26 | 68 | 0.38 |
| 3f | Paint Filler | Byk-310 | 15 | 625 | 23 | 102 | 0.23 |
| $3g^1$ | Paint Filler | Byk-310 | 17 | 510 | 28 | 69 | 0.41 |
| $3g^2$ | Paint Filler | Byk-310 | 15 | 505 | 22 | 79 | 0.27 |
| $3g^3$ | Paint Filler | Byk-310 | 15 | 515 | 23 | 76 | 0.30 |
| $3g^4$ | Paint Filler | Byk-310 | 14 | 500 | 21 | 76 | 0.27 |
| 4a | Glass | — | 14 | 485 | — | — | — |
| 4b | Glass | Byk-310 | 14 | 495 | 30 | 71 | 0.42 |

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An effect paint comprising a homogeneous mixture of at least one liquid crystal side-chain polymer with mesogenic units, and at least one surface-active compound which automatically aligns the mesogenic units in the chiral-nematic arrangement during paint application to produce a distinct color effect.

2. The effect paint according to claim 1, wherein the polymers are polysiloxanes.

3. The effect paint according to claim 1, wherein the surface-active compound is a polysiloxane or a polyacrylate.

4. The effect paint according to claim 1, comprising from 0.01 to 5.0 wt. % of the surface-active compound.

5. An object painted with a color-determining paint layer comprising a homogeneous mixture of a closed film of crosslinked liquid crystal side-chain polymers with mesogenic units arranged at least approximately chiral-nematically, and at least one surface-active compound which automatically aligns the mesogenic units in the chiral-nematic arrangement during paint application to produce a distinct color effect.

6. An object according to claim 5, wherein said object is painted in multiple layers.

7. The object according to claim 5, wherein the object is a motor vehicle body.

8. The object according to claim 5, wherein the polymers are polysiloxanes.

9. The object according to claim 5, wherein the surface-active compound is a polysiloxane or a polyacrylate.

10. The object according to claim 5, wherein the color-determining paint layer comprises from 0.01 to 5.0 wt. % of the surface-active compound.

11. A method for painting an object with an effect paint made of liquid crystal side-chain polymers with mesogenic units arranged at least approximately chiral-nematically, said method comprising the step of applying to the object an effect paint comprising a homogeneous mixture of liquid crystal side-chain units with mesogenic units and at least one surface-active compound which automatically aligns the mesogenic units into a chiral-nematic arrangement during paint application to produce a distinct color effect.

12. A method according to claim 11, wherein the paint is applied by spraying or dipping.

13. The method according to claim 11, wherein the paint further comprises a solvent.

14. The method according to claim 11, wherein the paint is water-based.

15. The method according to claim 11, wherein the paint is in powder form.

* * * * *